United States Patent [19]

Ingemann, deceased

[11] Patent Number: 5,040,357
[45] Date of Patent: Aug. 20, 1991

[54] METHOD AND APPARATUS FOR CLOSING CONTAINERS

[76] Inventor: Ole Ingemann, deceased, late of Ryslinge; by Ruth Ingemann, legal representative, Tranehajen 286, 5250 Odense SV, both of Denmark

[21] Appl. No.: 457,705
[22] PCT Filed: May 18, 1989
[86] PCT No.: PCT/SE89/00275
  § 371 Date: Mar. 9, 1990
  § 102(e) Date: Mar. 9, 1990
[87] PCT Pub. No.: WO89/11419
  PCT Pub. Date: Nov. 30, 1989

[30] Foreign Application Priority Data

May 19, 1988 [SE] Sweden .................................. 8801875

[51] Int. Cl.[5] .................. B65B 7/28; B65B 51/10
[52] U.S. Cl. ......................................... 53/478; 53/300; 53/329.3; 53/367; 53/485; 156/73.1; 156/580.1
[58] Field of Search ................ 53/281, 300, 329, 367, 53/368, 471, 478, 485, 373, 329.3; 156/69, 73.1, 580.1, 580.2; 384/109

[56] References Cited

U.S. PATENT DOCUMENTS

| 2,527,885 | 10/1950 | Krueger | 53/368 X |
| 3,308,848 | 3/1967 | Johnson et al. | 384/109 X |
| 3,661,661 | 5/1972 | Berleyoung | 156/580.1 |
| 3,711,939 | 1/1973 | Stoll | 53/437 X |
| 4,282,699 | 8/1981 | Embro, Jr. | 53/373 X |
| 4,411,720 | 10/1983 | Sager | 53/485 X |
| 4,631,685 | 12/1986 | Peter | 156/580.1 X |
| 4,708,213 | 11/1987 | Mohr et al. | 53/329 X |

FOREIGN PATENT DOCUMENTS

| 349998 | 10/1972 | Sweden . | |
| 721373 | 3/1980 | U.S.S.R. | 53/367 |
| 1173384 | 12/1969 | United Kingdom . | |
| 2123378 | 5/1972 | United Kingdom . | |

Primary Examiner—John Sipos
Assistant Examiner—Linda B. Johnson
Attorney, Agent, or Firm—Ladas & Parry

[57] ABSTRACT

A method and apparatus for sealingly fixing a lid (20) to the opening flange (11) of a container body (10) includes a reception device (30) with a support surface (34) for receiving and supporting the container body by abutment of the flange against the support surface. A sealing device (60) applies a pressure to the lid placed between the sealing device and the flange to form a joint which units the lid with the flange. The reception device has a part-spherical surface (3) and a resting device (40) has a part-spherical surface (41) for cooperation with the spherical bounding surface of the reception device. A closed space (49) is formed between the reception device and the resting device, this space being supplied with pressure medium for the formation of a gap (43) between the part-spherical surfaces, whereby the sealing device (60), under abutment against the lid, adjusts through the intermediary of the lid and the opening flange, the reception device (30) into a position in which the pressure of the sealing device against the lid substantially uniformly distributed.

19 Claims, 8 Drawing Sheets

METHOD AND APPARATUS FOR CLOSING CONTAINERS

FIELD OF THE INVENTION

The present invention relates to a method and an apparatus for sealingly closing a container body of substantially plastic material by means of a lid of substantially plastic material.

BACKGROUND AND PRIOR ART

In many physical applications, there is a need for sealingly closing containers of substantially plastic material by means of an oblate or a lid of substantially plastic material. In particular for containers intended for the long-term storage of foods, extreme demands are placed on the closure technology, since unsealed closures may entail that, after a time, the contents of the containers will be tainted, with the consequential risk of poisoning if the contents are consumed. In certain physical applications, pasteurization of the filled container takes place in conjunction with the filling operation, which places extremely high demands on the strength of the closure, because of the combination of high temperature and high interior pressure which occurs during the pasteurization.

In order for a satisfactory and tight closure to be obtained, it is, in such instance, necessary that a substantially uniform abutment pressure be applied between those surfaces in which lid and container body are united with one another. In practice, it has proved that even at relatively slight variations in the pressure in different parts of the region of the intended joint, unacceptable sealing in the closure will occur. The requirement of uniform pressure distribution described here applies, for example, in hot glue sealing, using hot melt adhesive, and particularly in physical applications in which the lid is welded against the opening edge of the container.

Containers of plastic material for foods are often produced from laminate material, there being on occasions as many as 8-10 layers in the laminate. One problem which occurs in thick and/or laminated plastic material is that the thickness of the material occasionally varies. In such an event, it is generally at the opening portion of the container where such thickness variations occur, in which instance for example an opening flange will, as a rule, have in its circumferential direction, only one thicker portion and only one thinner portion which gradually and continually merge into one another. The thickness variation described in the foregoing particularly occurs in the opening flange of containers produced by thermoforming.

In certain other physical applications in which the material thickness in the anchorage regions of the lid and the opening portion of the container body is great, hot welding is not a practical proposition, since such a welding technology would entail low manufacturing capacity output because of the good thermo-insulation properties of the plastic material. Consequently, attention has recently been directed at the possibility of employing so-called ultrasonic welding for fixing the lid to the opening portion of the container. It is obvious to the person skilled in this art that securement of the lid by means of ultrasonic welding can also be employed in physical applications in which the lid and/or opening portion in the anchorage region consists of thin material. However, it generally applies that, on the employment of ultrasonic welding, extraordinarily uniform distribution of the abutment pressure is required in those surfaces where the weld is formed in order that a tight and continuous joint be obtained in the weld region.

In ultrasonic welding, one of the components (lid or opening portion, respectively) is generally designed with at least one welding indication in the form of a cam-like ridge. In such instance, it is important that this ridge which, for example, is placed on the flange of the container and/or the lid, abuts with constant pressure against the anchorage region of the lid and/or the container in all of its parts, in order that the connection in the weld be tight and complete. To achieve the constant pressure during the circumferential welding, attempts have been made in the art to employ a resilient support. In such instance, it has, granted, proved possible to attain a certain degree of compensation for any possible misalignments which may be present in the structure, and which entail that the support on which the opening flange of the container body rests makes an angle with that plane made by the abutment surface of the welding electrode (the sonotrode) of the welding device, but because of the characteristics of the springs involved, an unacceptable variation of the abutment pressure may occasionally occur in the region of the contemplated joint. The same applies if the springs are replaced by an elastically yieldable material, for example a pad of rubber.

Attempts have also been made to render the structures highly rigid so as to avoid these problems. However, also in such physical applications it has proved impossible to achieve such strict tolerances that the requisite correspondence of the abutment surfaces of the support and the welding device is realized, and thereby the desired weld quality. Nor can any compensation for unevenness in material thickness be achieved using a technology geared to the employment of rigid structures.

It has proved, in ultrasonic welding, that the distance between the welding surface of the welding device and the back-up may only vary by at most 0.1 mm in order that the desired quality in the joint between the lid and the opening portion can be achieved. This limit of 0.1 mm also includes calculated variation in thickness of both the lid and the opening flange. In injection molded lids, it is possible to attain a deviation of at most 0.05 mm, but in vacuum molding, the maximum deviation is larger. If the container body is injection molded, there will thus be obtained, for the opening portion thereof, also a maximum thickness variation of 0.05 mm, which entails that the maximum permitted deviation of 0.1 mm is "consumed" by the plastic material. Hence, even in a substantially completely matching alignment of the plane of abutment of the welding device and the support (for supporting the container body which is to be sealed) there is a risk that an unacceptable joint will be created. In order to achieve completely satisfactory quality of the joint, there is thus required, in ultrasonic welding, a technology which compensates both for differences in the thinner and thicker portions of the opening flange for differences in thinner and thicker portions of the lid, and/or for misalignments in the equipment.

SUMMARY OF THE INVENTION

The present invention has for its object to realize a method and an apparatus in which such compensation is effected. This is achieved in accordance with the invention.

By forming, by excess pressure, the gap-like space between the spherical surface of the reception device and the corresponding spherical surface of the resting means, the reception device may be turned in relation to the resting means without any friction whatever. When, by relative movement between the resting means and the welding device, the welding device exercises, by the intermediary of the lid, a pressure on the opening portion, the welding device will, when the pressure is concentrated to or higher along a portion of the circumference, turn the reception device in relation to the resting means, the reception device thereby being adjusted to a position in which the pressure from the welding device is substantially uniformly distributed in the circumferential direction throughout the entire abutment surface between the lid and the opening flange. In the continued relative movement between the resting means and the welding device, the reception device is displaced into abutment against the resting means in the region of the spherical surfaces, still with maintained correct orientation, whereby the reception device is locked in relation to the resting means in that position where the abutment pressure between the lid and the container flange is substantially equal throughout the entire circumferential abutment surface. There will hereby be obtained the sought-for effect and one of the conditions applying for a fully adequate sealing closure, for example by ultrasonic welding, will be satisfied.

In one preferred embodiment of the apparatus according to the present invention, the closed space is formed by a circumferential recess whose center axis is substantially at right angles to a plane through the support surface of the reception device for the flange of the opening portion.

The nature of the present and its aspects will be more readily understood from the following brief description of the accompanying drawings and discussion related thereto.

DETAILED DESCRIPTION OF PREFERRED EMBODIMENTS

Referring to the drawings, the embodiment shown in FIGS. 1a-1f includes a container body 10 with a closed bottom 14 and an opening portion 15 which is provided with a flange 11. In the figures, the flange has an upwardly directed surface 12 which is provided with an upstanding cam-like ridge 21a intended to constitute a welding indication. The opposing bounding surfaces of the flange have reference numeral 13. A lid 20 is located above the container body and rests against the circumferential welding indications 21a at a circumferential edge region 22. While the lid is shown here as a planar sheet, it will be obvious that the region inside the circumferential edge region 22 may be of any optional configuration, without departing from the present invention.

In the figures, there is further shown a frame 70 which cooperates with a support or reception device 30 in that the reception device rests on a support surface 71 on the frame with a downwardly facing circumferential abutment surface 38, at least during the initial phase of the sealing process.

In the illustrated embodiment, the reception device 30 includes an upper portion 37 and a lower portion 31 which is separable from the upper portion and is occasionally referred to as a cradle. The lower portion or cradle is provided with one or more part spherical bounding surfaces 33 disposed circumferentially of the cradle, these surfaces being of convex form and located on a circumferential portion 32. In physical applications in which the circumferential portion includes a central cavity, this is, as a rule, sealingly closed, for instance as shown on the drawings, by means of a center plate 80. The upper portion 37 of the reception device is provided with a lower abutment surface 36 for cooperation with an upper abutment surface 35 of the lower portion 31 of the reception device. Furthermore, the upper portion of the reception device is provided with a rim having an upwardly facing support surface 34 on which the flange 11 of the container rests.

Figure 1A:
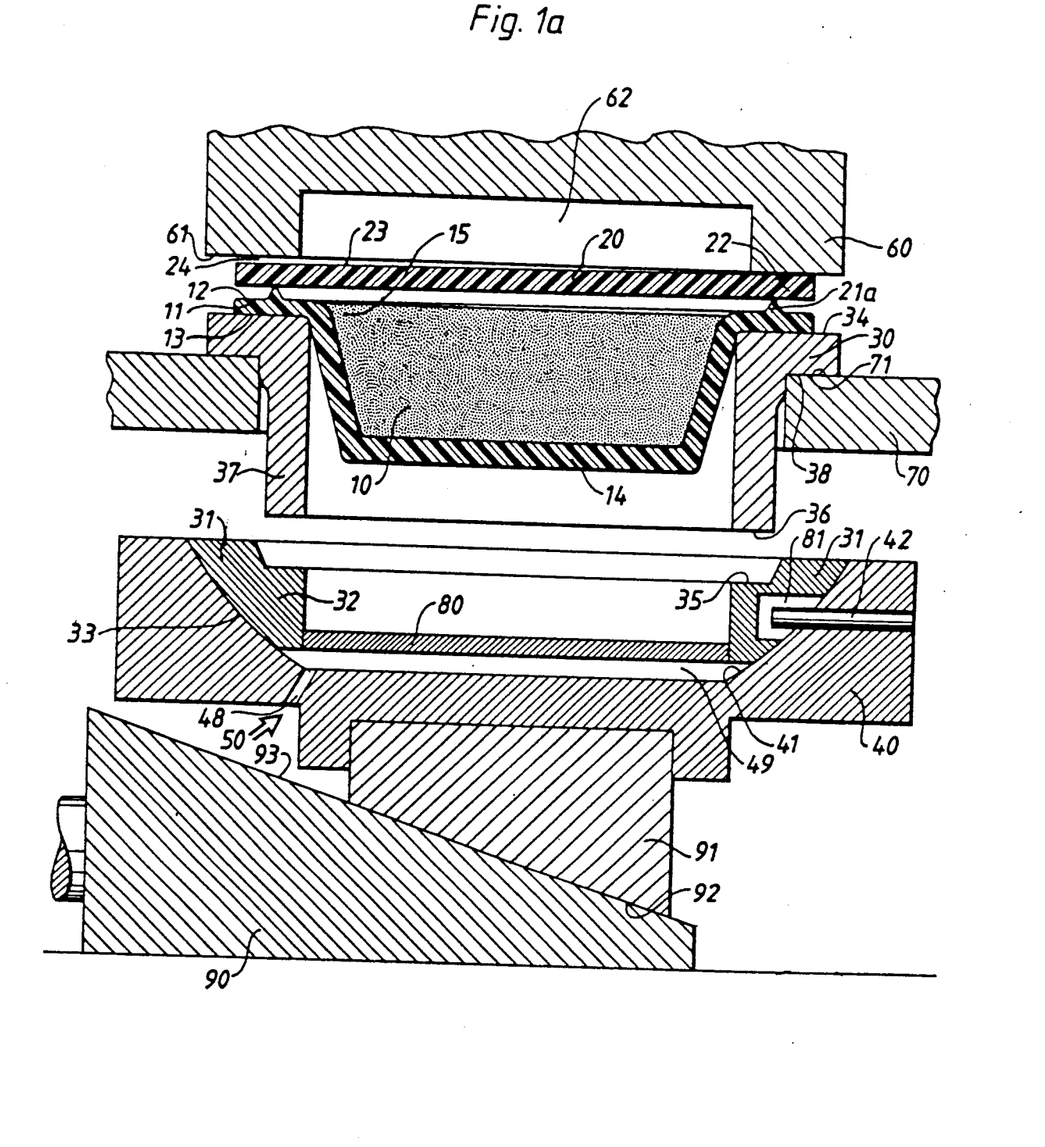
FIGS. 1a-1f are sections through one embodiment of an apparatus according to the present invention during different stages of operation.
Figure 1B:
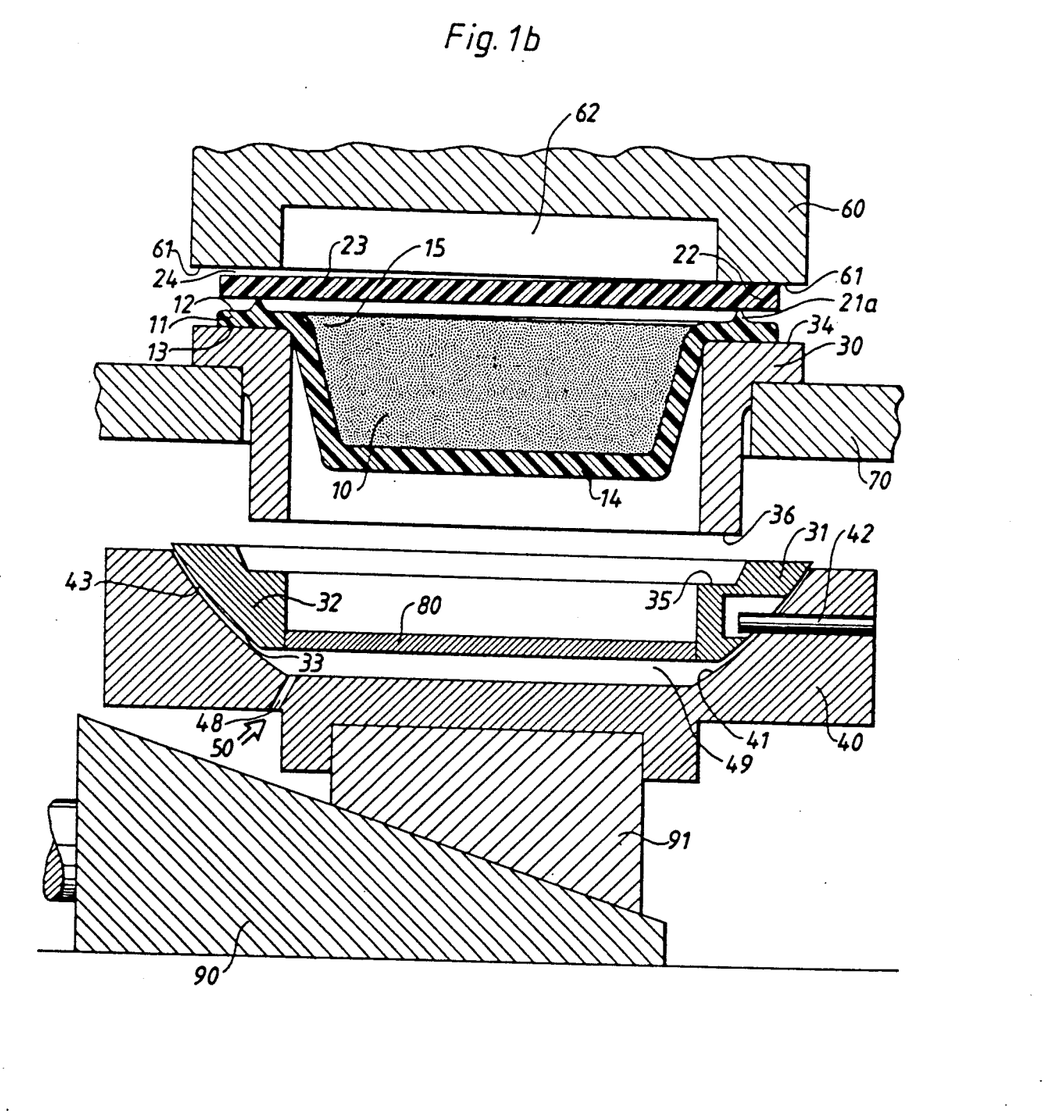

Below the lower portion 31 of the reception device 30, there is disposed a resting means 40 which is obliquely upwardly and inwardly defined by one or more spherical bounding surfaces 41 of a concave configuration adapted to the configuration of the spherically convex bounding surface or surfaces 33 of the reception device. In the starting position, i.e. the position which is shown in FIG. 1a, the resting means 40 and the lower portion 31 of the reception device 30 form therebetween a substantially closed space 49. The resting means 40 is further provided with at least one bolt 42 which projects into a corresponding cavity 81 in the circumferential portion 32 of the lower portion 31. Each respective cavity is dimensioned to enclose, with clearance, the bolt cooperating with the cavity, and thereby permit limited relative displacement between the resting means 40 and the lower portion 31 of the reception device. A supply arrangement 48, shown on the drawings as a channel, communicates with the closed space 49 through the intermediary of a closeable connection with a pressure device (not shown), for example a pressure container, for the supply of a pressure medium 50 to the closed space 49. As a rule, a gas mixture, preferably air, is used as the pressure medium.

Above the container, there is disposed a sealing device 60, for example a welding device, which preferably consists of the emitter body of an ultrasonic emitter (a sonotrode). In the figures, the sealing device is shown with a circumferential, planar and downwardly facing abutment surface 61 for cooperating with the circumferential edge region 22 of the lid 20. The sealing device is provided, inside the circumferential abutment surface, with a recess 62 so as not to come into contact with any possible raised central portions of the lid.

In conjunction with the resting means 40, there are provided drive means 90, 91 for displacing the resting means in a direction towards the sealing device 60. In the figures, the drive means are shown as a body 91 cooperating with the resting means 40 and with a lower bounding surface 92 oriented at an oblique angle and cooperating with a wedge-shaped body 90 provided with an upwardly facing oblique bounding surface 93.

In practicing the present invention in an embodiment in which the sealing device is designed as a welding device for ultrasonic emission, the container body 10 is placed in the position illustrated in FIG. 1a, whereupon the lid 20 is placed over the opening portion of the container body and abuts against the welding indication 21a. It will be apparent from this drawing figure that the flange 11 is of diminishing thickness (from right to left in FIG. 1), for which reason there is formed a wedge-shaped gap 24 between the planar circumferential abutment surface 61 of the welding device and the upper bounding surface 23 of the lid 20. It is obvious that a corresponding wedge-shaped gap is formed in applications wherein only the thickness of the lid is diminishing. As will be apparent from the following description, this gap will be eliminated during the sealing operation.

Figure 1C:
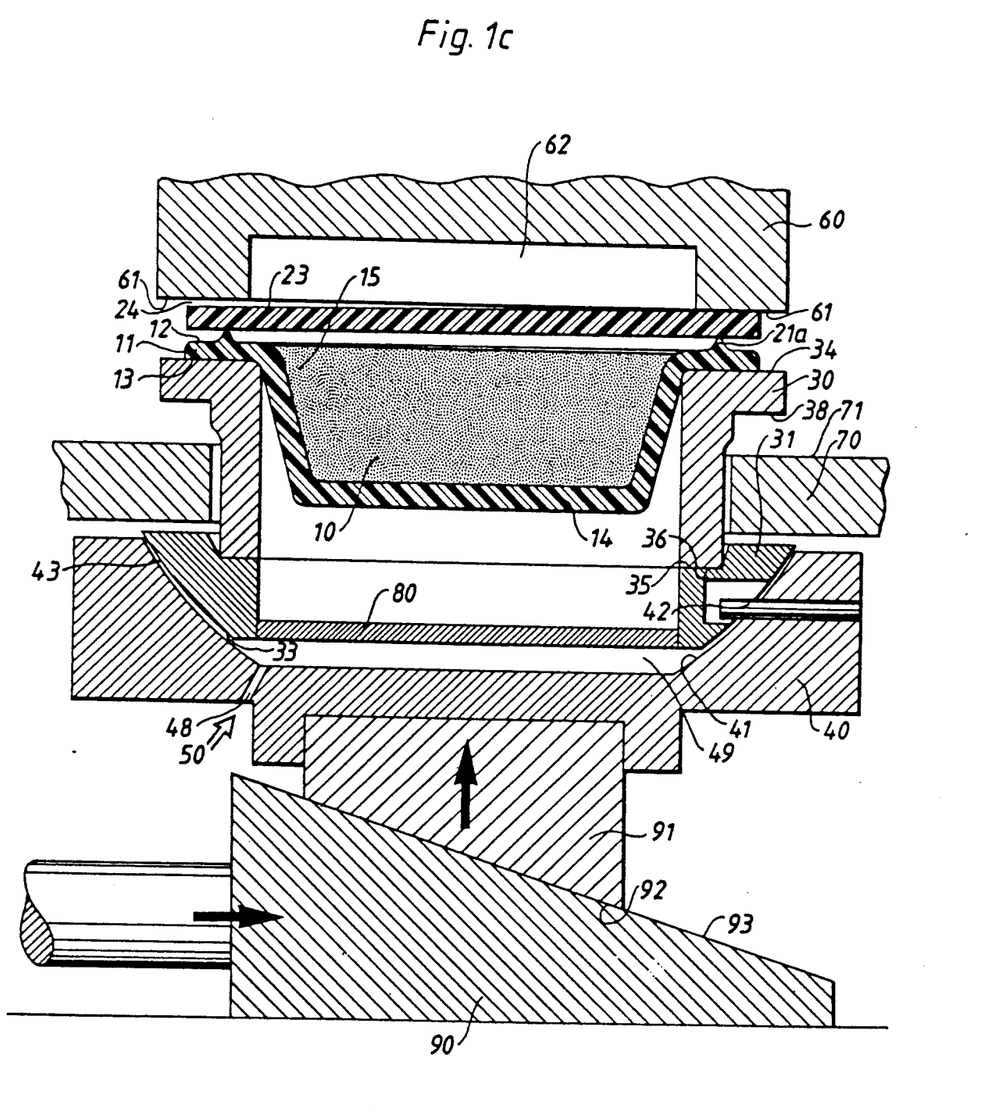

Pressure medium is then supplied to the substantially closed space 49 through the channel 48, the lower portion 31 of the reception device being, as a result of the excess pressure in the closed space, displaced somewhat upwardly in relation to the resting means 40. At this point, the spherical abutment surfaces 33, 41 are released from one another at the same time as the pressure medium passes through a gap 43 which, on raising of the lower portion of the reception device, is formed between the spherical surfaces (Cf FIG. 1b). The bolt or bolts 42 and cavity 81 cooperating with each respective bolt define the maximum width of the gap 43 and prevent the lower portion of the reception device from being separated from the resting means 40. While continuing the supply of pressure medium to the space 49, the wedge-shaped body 90 is displaced to the right (Cf. FIG. 1c), whereby the drive body 91 is urged upwardly and thereby displaces the resting means 40 upwardly in the figure. In such instance, the lower portion 31 of the reception device and the resting means 40 will substantially maintain their mutual positions. By continued movement of the drive means 90,91, the lower portion 31 of the reception device will be displaced such that its upper abutment surface 35 is urged into abutment against the lower abutment surface 36 of the upper region 37 of the reception device, whereafter, by continued actuation of the drive means 90,91, and by consequentially occasioned relative movement between the resting means 40 and the frame 70, the abutment between the downwardly facing circumferential abutment surface 38 and the upwardly facing support surface 71 on the frame will be cancelled. The resting means 40 now carries the reception device 30, the container 10 with its contents and the lid 20. As a result of the supply of pressure medium, the excess pressure will be sustained in the substantially closed space 49 and thereby also the gap 43.

Figure 1D:
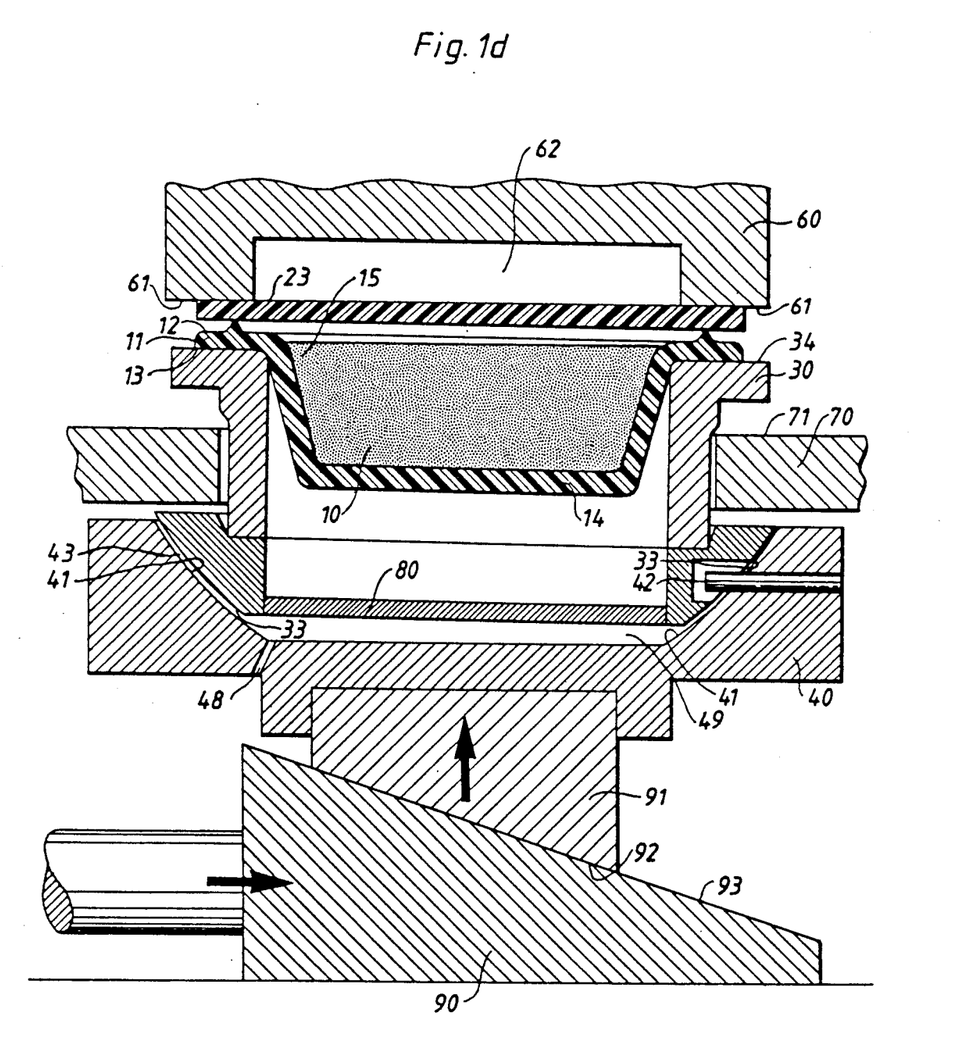
Figure 1E:
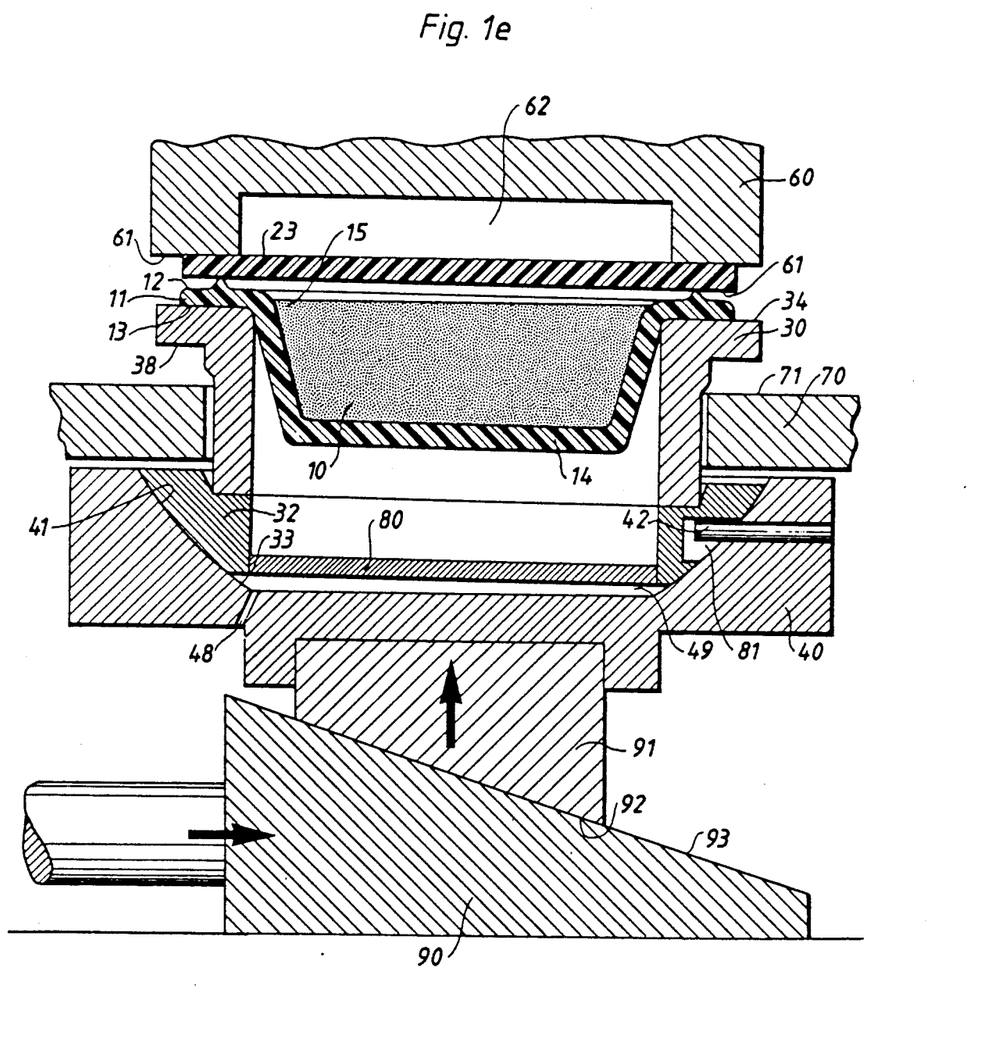
Figure 1F:
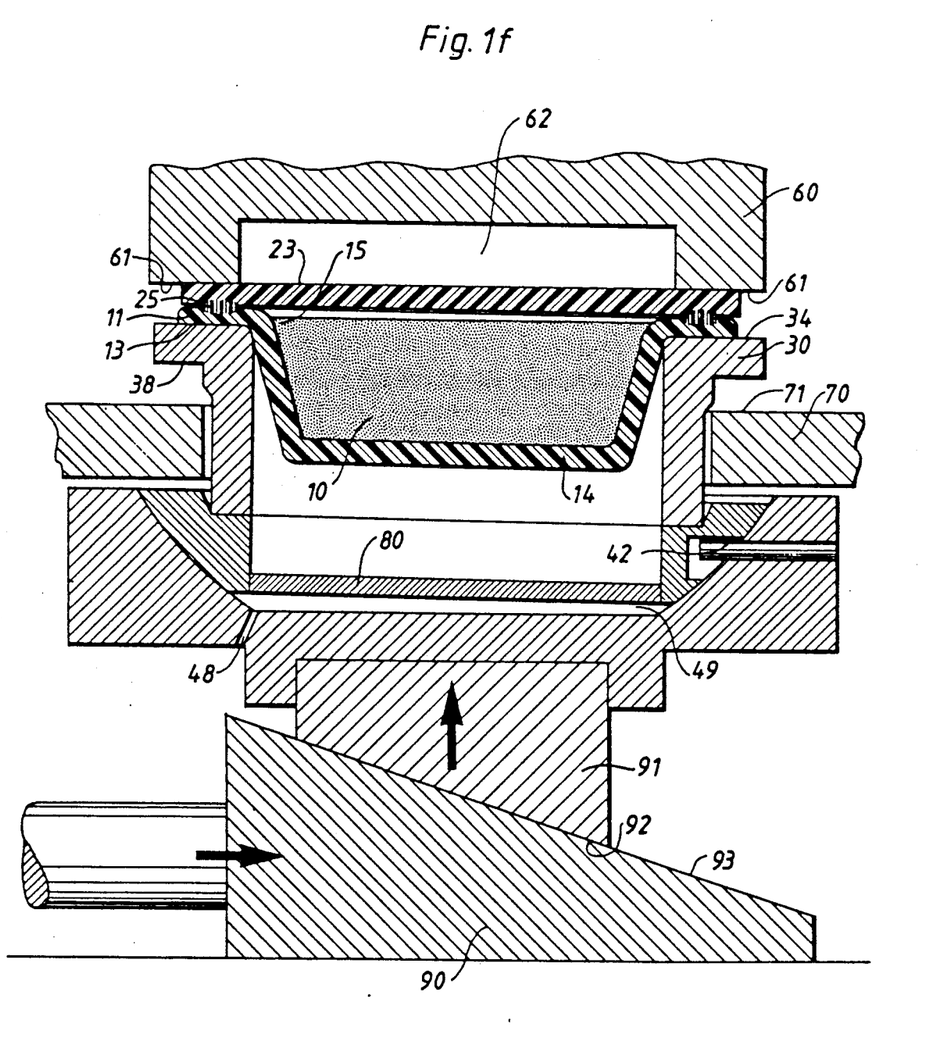

As a result of continued movement of the drive means 90,91 and consequential upward movement of the resting means 40 (Cf. FIG. 1d) there occurs, through the intermediary of the lid 20 and the flange 11, an interaction force between the welding device 60 and the reception device 30, causing the reception device to turn about the center point of the spherical surfaces 33. The gap 43 between the spherical surfaces 33 and 41 of the reception device and the resting means, respectively, eliminates the friction between the spherical surfaces, for which reason, during the continued upward movement (Cf. FIG. 1e), the upper side 23 of the lid will be adjusted to a position which is parallel to the abutment surface 61 of the welding device. While this position is maintained, the spherical surfaces 33, 41 of the reception device and the resting means are thereafter displaced, by the continued movement of the drive means 90,91, into abutment against one another, whereby the reception device is fixed in a position where the upper bounding surface of the lid maintains the previously described orientation. As a result, the welding device will press, with substantially constant pressure, the lid against the welding indication 21a of the flange 11 over the entire extent of the flange. Thereafter, the welding device supplies the requisite energy—which in the currently described embodiment consists of ultrasonic energy—to the material regions of the lid and the opening flange, respectively, in the intended connection region, and the lid and flange of the container body are fixed to one another in a weld joint 25. In the embodiment illustrated in FIGS. 1a-1f, the joint is formed initially at the tip of the weld indication 21a. Once the welding cycle has been completed (Cf. FIG. 1f), all parts of the apparatus return to the position illustrated in FIG. 1a. The sealed container is removed and a new container is placed in the reception device 30 for sealing.

Figure 2A:
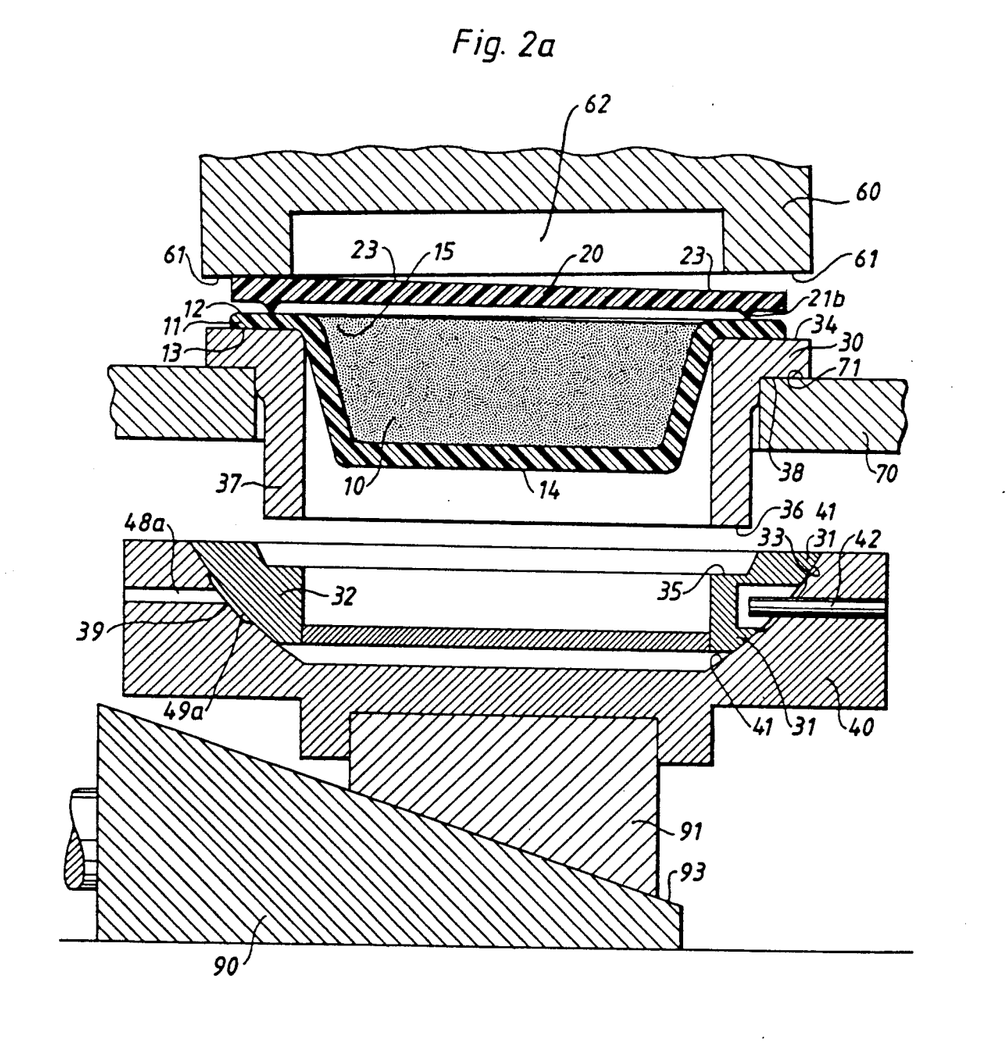
FIGS. 2a-2b show an alternative embodiment of such an apparatus.
Figure 2B:
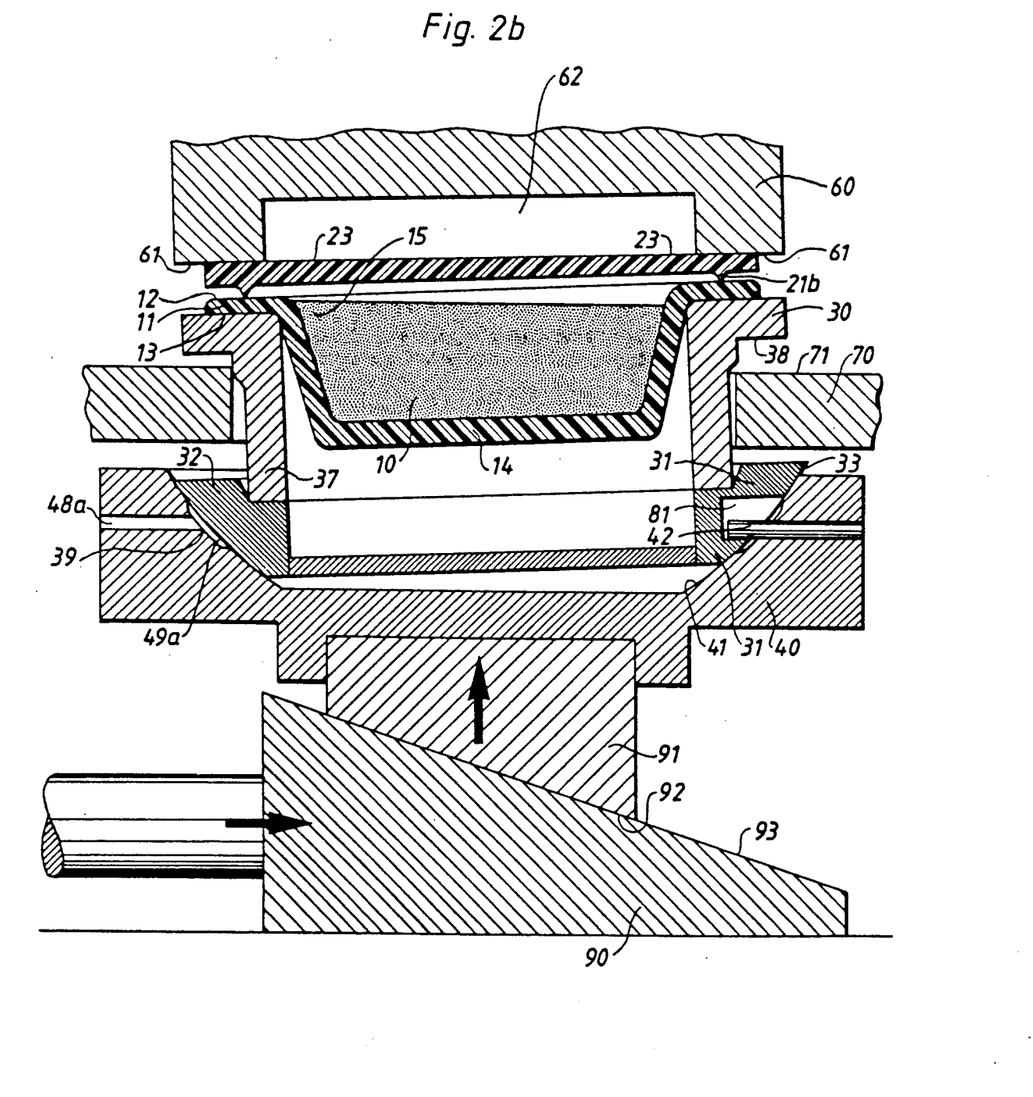

FIGS. 2a and 2b illustrate an alternative embodiment of an apparatus according to the present invention, FIG. 2a corresponding to FIG. 1a and FIG. 2b corresponding to FIG. 1e. The same elements are designated by the same reference characters. The substantially closed space 49a is, here, formed as a circumferential recess 39 in the circumferential spherical surface or surfaces 41 of the resting means 40. Through the intermediary of a channel 48a, the pressure medium in the pressure container can be selectively supplied to the substantially closed space 49a. When the space has thereby been placed under pressure, a progressive raising takes place of the lower portion 31 of the reception device, whereby the friction-cancelling gap between the spherical surfaces 33, 41 occurs. This thereby creates the possibility for the desired frictionless adjustment of the position of the reception device in relation to the resting means, and thereby also the desired exact orientation of the lid 20 in relation to the circumferential abutment surface 61 of the welding device. The function of the apparatus in the embodiment according to FIGS. 2a and 2b corresponds to that described for the embodiment according to FIGS. 1a-1f.

It will be obvious that the closed space 49a shown in FIGS. 2a, 2b may also be supplemented by a centrally located space corresponding to the previously described closed space 49, in that the center plate 80 shown in FIGS. 1a-1f is included in the reception device 30. In certain embodiments, the circumferential recess 39 is disposed in the circumferential spherical surface or surfaces 33 of the reception device. Alternatively, the recess 39 is provided in part in both the spherical surface 33 of the reception device 30 and in the spherical surface 41 of the resting means.

It should be observed that FIGS. 2a and 2b illustrate a physical application of the present invention in which this is employed to correct the orientation of the reception device 30 in an apparatus in which, because of misalignment in the apparatus, the welding device 60 has a circumferential abutment surface 61 of incorrect orientation. Naturally, such faulty orientation may also be compensated for in the embodiment of the present invention described with reference to FIGS. 1a-1f, and the previously described uneven material distribution may be compensated in the embodiment described with reference to FIGS. 2a-2b. It will also be obvious to the skilled that, when the abutment surface 61 of the welding surface is incorrectly oriented and, at the same time, the material thickness of the plastic material of the flange 11 and/or of the lid varies, employment of the apparatus according to the present invention will attain requisite compensation for the formation of a fully adequate seal. For a number of reasons, such as simplicity of construction, accessibility to the area between the sealing device (welding device) and reception device, there is desire in this art to be able to employ so-called single column machines. These suffer from the drawback that the column is bent somewhat as a result of the asymmetry in the design, in particular when the welding device is urged against the lid. The present invention also corrects faulty orientation of the welding device arising out of the previously disclosed design of the sealing equipment. FIGS. 2a-2b illustrate one embodiment of lid and container body in which the welding indications 21b designed as cams are disposed on the lid.

The reception device 30 has been shown above in embodiments in which it is composed of an upper portion 37 and a lower portion 31 separable from the upper portion. According to the present invention, the reception device forms, in certain embodiments, a combined unit.

It will be obvious to those skilled in the art that, in certain embodiments, the upper portion 37 of the reception device can be constructed to emit energy to the flange 11 for the formation of the joint 25.

The drawing—and to a certain degree also the description—refer to one embodiment of the present invention in which one or more welding indications 21a, 21b are disposed on the lid and/or the opening flange so as to facilitate formation of the connection between the lid and the opening flange. Such an embodiment is particularly suited for use when the connection consists of a weld joint which is formed by ultrasonic welding.

However, it is obvious that the present invention enjoys a broader field of application and is generally intended for use in the sealing of containers or the securement of a corresponding end to a container body employing a technology which requires uniformly distributed abutment pressure in the region of connection of those surfaces between which the joint is formed, for example by hot welding, gluing etc.

The above detailed description has referred to but a limited number of embodiments of the present invention, but it will readily be perceived by those skilled in the art that the invention encompasses a large number of embodiments without departing from the spirit and scope of the appended claims.

What is claimed is:

1. A method of sealing a lid to a flange surrounding the open mouth of a container, said method comprising
    supporting the flange of the container on a support having a cavity in which the body of the container is freely suspended, the support resting on a frame,
    positioning a lid 20 in facing relation with the flange,
    positioning a welding die around the lid in facing relation with a surface of the lid remote from the surface of the lid facing the flange of the container,
    providing said support with a part-spherical surface facing a corresponding part-spherical surface of a resting means,
    introducing a pressure medium between the part-spherical surfaces of the support and the resting means so that a gap is formed between the support and the resting means in which gap the pressure medium is present and provides relatively frictionless support of said support on said resting means,
    providing relative movement between the welding die and the resting means towards one another to lift the support and the container therewith off the frame so that the container and the support are now supported by the resting means via said gap so that said lid and said flange come into abutment with one another over the entire circumferential extent thereof with substantially the same pressure, due to relative rocking movement of said support with respect to said resting means, via the pressure medium in said gap, which enables the lid and flange to align themselves, and
    continuing said relative movement between the welding die and the resting means towards one another to cause the resting means and the support to take up said gap and come into locked contact with one another along said part-spherical surfaces thereof, and apply the now aligned lid and flange against one another with pressure to form a seal therebetween.

2. A method as claimed in claim 1 comprising supplying energy where the lid and flange are in contact with one another to assist in the formation of said seal.

3. A method as claimed in claim 2 wherein at least one of said lid and flange is provided with a circumferential cam-like projection and said energy is ultrasonic sound which produces said seal by commencing the formation of the seal in the region of the cam-like projection.

4. A method as claimed in claim 1 comprising restricting relative movement between the support and the resting means to limit the size of said gap.

5. A method as claimed in claim 1 wherein said pressure medium is a gas.

6. A method as claimed in claim 1 wherein said lid and said container are made of plastic material.

7. Apparatus for sealing a lid to a flange surrounding the open mouth of a body of a container; said apparatus comprising
    means including a support for supporting the flange of the container on said support, said support having a cavity in which the body of the container is suspended,
    a welding die positioned around a lid facing the flange of the container,
    a frame supporting said support,
    resting means below said support,
    said support having a part-spherical surface facing a corresponding part-spherical surface of said resting means,
    means for introducing a pressure medium between the part-spherical surface of the support and the part-spherical surface of the resting means so that a gap is formed between the support and the resting means in which the pressure medium is present and provides relatively frictionless support of said support on said resting means and means providing relative movement between the welding die and the resting means towards one another
    (1) to lift said support off said frame and bring said lid and said flange into abutment with one another over the entire circumferential extent thereof with substantially the same pressure, said support now being capable of undergoing relative rocking movement with respect to said resting means, via the pressure medium in said gap, to enable the lid and flange to align with one another and come into abutment with one another over the entire circumferential extent thereof between said die and said support with substantially the same pressure, and (2) to cause the resting means and the support thereafter to take up said gap and come into locked contact with one another along said part-spherical surfaces thereof, and apply said lid and said flange against one another with pressure to form a seal therebetween.

8. Apparatus as claimed in claim 7 wherein said resting means and said support define a closed space in which said pressure medium is introduced.

9. Apparatus as claimed in claim 8 wherein said resting means is provided with a circumferential recess which forms said closed space.

10. Apparatus as claimed in claim 7 wherein said support comprises an upper portion and a lower portion, said upper and lower portions being separable from one another, said part-spherical surface of said support being on said lower portion.

11. Apparatus as claimed in claim 10 wherein said means which provides relative movement between the welding die and the resting means engages said resting means to displace the same towards and away from said upper portion of said support.

12. Apparatus as claimed in claim 11 wherein said frame is positioned to support said upper portion prior to bringing the lid and flange into substantially uniform pressure abutment with one another, said upper portion being lifted off said frame by said lower portion and being supported by said lower portion when the lid and flange are brought into substantially uniform pressure abutment with one another.

13. Apparatus as claimed in claim 7 wherein said support has a planar face on which the flange of the container rests, said part-spherical surface of said support having a center located substantially in the plane of said planar face when said flange and lid are in abutment with substantially the same pressure over their entire circumferential extent.

14. Apparatus as claimed in claim 13 wherein a radius from said center to the part-spherical surface of the support forms an angle of at least 10° with said plane of the planar face of said support.

15. Apparatus as claimed in claim 14 wherein said angle is at least 20°.

16. Apparatus as claimed in claim 7 wherein said means for providing relative movement between said welding die and said resting means comprises a drive means engaging said resting means to move the same towards said welding die, said resting means supporting said support, in lifted state off said frame, when the lid and flange are pressed against one another to form said seal.

17. Apparatus as claimed in claim 7 wherein said welding die includes means for supplying energy to assist in forming said seal.

18. Apparatus as claimed in claim 17 wherein said means for supplying energy supplies ultrasonic energy.

19. Apparatus as claimed in claim 10 wherein said upper portion of said support has a rim and said frame initially supports said upper portion of the support via said rim while said lower portion is separated from the upper portion and is supported on said resting means via the pressure medium in said gap.

* * * * *